June 8, 1965 H. BÜHLER 3,188,622
SYSTEM AND APPARATUS FOR MEASURING DISTANCES TRAVELLED BY A VEHICLE
Filed Nov. 5, 1962 2 Sheets-Sheet 1

INVENTOR.
HANSRUDI BÜHLER
BY
McGlew & Toren
ATTORNEYS.

United States Patent Office 3,188,622
Patented June 8, 1965

3,188,622
SYSTEM AND APPARATUS FOR MEASURING
DISTANCES TRAVELLED BY A VEHICLE
Hansrudi Bühler, Wallisellen, Switzerland, assignor to
Maschinenfabrik Oerlikon, Zurich, Switzerland
Filed Nov. 5, 1962, Ser. No. 235,427
Claims priority, application Switzerland, Nov. 7, 1961,
12,970/61
4 Claims. (Cl. 340—324)

This invention pertains, in general, to systems and apparatus useful in controlling vehicles; and, in particular, to a system and apparatus for measuring the distance travelled, or to be travelled, by rail-travelling vehicles so that the motorman can initiate action as the vehicle passes a warning signal in order to insure stopping of the vehicle before, at, or shortly after the vehicle passes a main signal which is situated at a predetermined distance from the warning signal.

Although the system and apparatus of the present invention is hereinafter described with reference to vehicles which are constrained to travel on rails (which may be a conventional double track rail or a monorail track) it is to be understood that the application of the present system and apparatus is not limited to vehicles constrained to travel on rails. The system, and apparatus, provided by the present invention is equally applicable and useful in connection with highway travelling motor vehicles.

When a vehicle is passing a warning signal and continuing toward a main signal, which is situated at a fixed distance from the warning signal, it is highly desirable for safety reasons to provide the operator of the vehicle with a visible indication of the distance traversed from the warning signal, or the remaining distance to be travelled to the main signal, so that the operator can initiate action to bring the vehicle to a stop safely within a given distance.

Accordingly, one object of the present invention is to provide means for displaying travelled distances, or distances to be travelled, to the operator of the vehicle.

Another object of the present invention is to promote safe and timely control of the stopping of a travelling vehicle.

Another object of the present invention is to provide means for accomplishing the aforementioned objects simply, reliably and economically.

According to an illustrative embodiment of the present invention there is provided a switch which is intended to be actuated by the vehicle operator as a warning signal is passed. The operation of the switch triggers a pulse generator which, in turn, initiates the action of a counter and logic circuitry. The counter further conditions the logic circuitry so that distance indicators, coupled with the logic circuitry, are sequentially actuated to provide a visible display of the distance travelled, or the distance to be travelled.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

Figure 1:
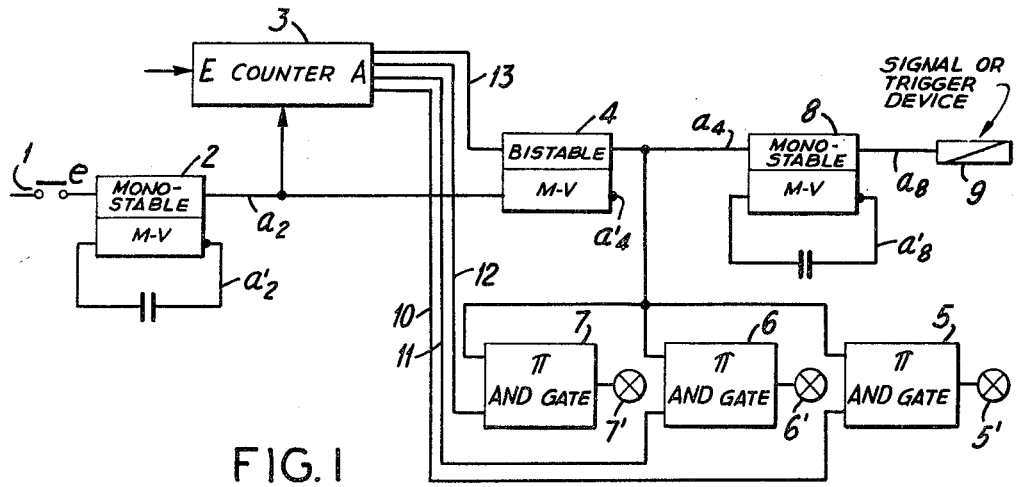
FIG. 1 is a block diagram of the measuring and controlling system according to one embodiment of the invention.

As is shown at FIG. 1, the switch 1 being normally open, as shown, is intended to be closed momentarily by the motorman or operator, or by the conductor, as the vehicle passes a warning signal. The switch 1 is serially coupled with an input terminal $e$ of a mono-stable multi-vibrator 2. The output $a2$ of the mono-stable multi-vibrator 2 is coupled, as shown, to an input of a counter 3 and to the input of a bistable multi-vibrator 4. The output $a4$ of the bistable multi-vibrator 4 is coupled, as shown, to the input of a mono-stable multi-vibrator 8 and to the input of the three AND gates 5, 6 and 7.

The member designated by the reference numeral 9 is coupled to the output $a8$ of the mono-stable multi-vibrator 8. The member 9 may be a warning bell, horn, or an electromagnetic actuator which, when actuated, operates a brake to cause the vehicle to be slowed and ultimately stopped. The electrical paths 10, 11 and 12 are, as shown, coupled between the output A of the counter 3 and an input of the AND gates 5, 6 and 7, respectively. In addition, the electrical path 13 is coupled between the output A of the counter 3 and an input of the bistable multi-vibrator 4. Coupled to the outputs of the three AND gates 5, 6 and 7 are the three indicating lamps 5', 6' and 7', respectively.

The counter 3 may comprise a number of logic switching units arranged in a manner well known in the art. At the input E of the counter 3 there are introduced a train of signal pulses. The appearance of each signal pulse at the input represents a predetermined elapsed distance; e.g., 50 feet.

Figure 2:
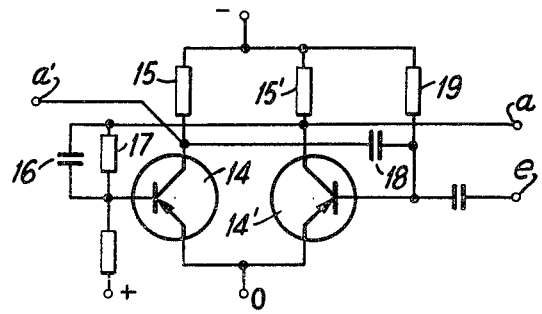
FIG. 2 is a schematic diagram of a multi-vibrator circuit representative of those employed in the embodiments of the invention illustrated at FIGS. 1 and 5.
Figures 3, 4:
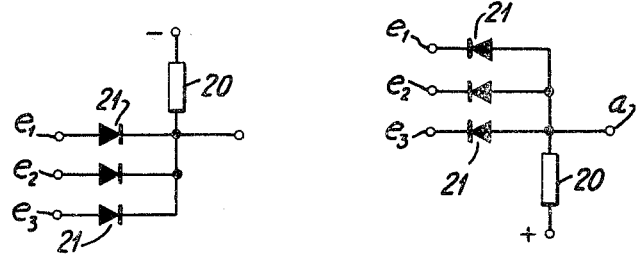
FIG. 3 is a schematic diagram of an AND gate representative of those employed in the embodiments of the invention illustrated at FIGS. 1 and 5.
FIG. 4 is a schematic diagram of an OR gate representative of the one employed in the embodiments of the invention illustrated in FIG. 5.

Before explaining in detail the operation of the system of FIG. 1, it will be helpful to first explain the circuits illustrated schematically at FIGS. 2, 3 and 4.

FIG. 2 is a schematic illustration of a multi-vibrator circuit. (FIG. 2 will be used for the purpose of explaining the operation of both a mono-stable multi-vibrator and a bistable multi-vibrator.) The mono-stable multi-vibrator has two transistors 14 and 14'. The emitters of the transistors are directly coupled with each other and with the terminal O. The collector electrodes of the transistors 14 and 14' are coupled with each other via the resistors 15 and 15'. Being unsymmetrically coupled, the multi-vibrator operation is mono-stable. Normally, the transistor 14' is conductive. But, transistor 14' can be blocked by introducing a positive voltage pulse at the input terminal $e$. When this positive voltage pulse is introduced at the input terminal $e$, the transistor 14 then becomes conductive via the feed back coupling represented by the capacitor 16 and the resistor 17. Subsequently, the capacitor 18 becomes charged so that after a predetermined time the mono-stable multi-vibrator reverts to its normal condition; i.e., the transistor 14' is conductive and the transistor 14 becomes non-conductive. For convenience, the non-conductive condition with respect to output terminals of the various circuit components comprising the system of the present invention is hereinafter designated as condition 0; the conductive condition is designated as condition 1. For example, in FIG. 2, normally, $a=0$ and $a'=1$; 1 being a predetermined negative potential. When a positive voltage pulse is introduced at terminal $e$ the normal condition of the mono-stable multi-vibrator of FIG. 2 is changed such that $a=1$ and $a'=0$. After a time which is determined by the RC circuit (resistor 19 and capacitor 18) the mono-stable multi-vibrator reverts to its normal condition; i.e., $a=0$ and $a'=1$.

A bistable multi-vibrator is arranged similarly to the mono-stable multi-vibrator, but the bistable multi-vibrator has symmetrical feed back couplings and thus has two stable conditions, rather than one stable condition as in the case of the mono-stable multi-vibrator. As is known, one input pulse will change the bistable multi-vibrator from one stable condition to another stable condition; another input pulse is required to change the bistable multi-vibrator from the second stable condition back to the first stable condition. For convenience, the first stable condition of the bistable multi-vibrator is called the normal condition; the normal condition being $a=0$ and $a'=1$, and the second bistable condition is such that $a=1$ and $a'=0$.

FIG. 3 is a schematic diagram of an AND gate. Three diodes 21 are coupled in parallel between the terminals $e1$, $e2$ and $e3$ and one terminal of the resistor 20. As is known, only when all of the input terminals $e1$, $e2$ and $e3$ have a negative potential introduced thereto no current flows through the resistor 20 and thus the potential at output terminal $a$ is designated as 1; i.e., $a=1$.

However, if the potential at any one or two of the input terminals is 0, current flows through the resistor 20 and the potential at the output terminal $a$ is also a 0 potential; i.e., $a=0$. Accordingly, as is well known, at the output terminal $a$ of the AND gate of FIG. 3 there will occur a signal ($a=1$) only when all of the input terminals $e1$, $e2$ and $e3$ have input signals introduced thereto simultaneously.

At FIG. 4 there is illustrated in schematic diagram form an OR gate. Three diodes 21 are coupled in parallel between three input terminals $e1$, $e2$ and $e3$, and one terminal of a resistor 20. At the other end of the resistor 20 there is introduced a positive potential (indicated by the + sign at FIG. 4). Accordingly, terminal $a$ is at the potential condition such that $a=1$ only if there exists a negative voltage at any of the input terminals $e1$, $e2$ or $e3$.

Referring again to the system illustrated in block diagram in FIG. 1, as long as the switch 1 is open, as illustrated, the following condition prevails: $a2=0$, $a2'=1$, $a4=0$, $a4'=1$, $a8=0$, and $a8'=1$. Since $a4=0$, the AND gates 5, 6 and 7 are blocked, so that signals from the counter 3 coupled with these AND gates via the paths 10, 11 and 12, respectively, will not cause the indicating lamps 5', 6' and 7' to light. As the vehicle passes a warning signal, the motorman closes the switch 1 momentarily. When closed, the switch 1 allows a positive voltage pulse to be introduced to the input $e$ of the mono-stable multi-vibrator 2. The introduction of the positive voltage pulse at terminal $e$ of the multi-vibrator 2 causes the multi-vibrator to "flip" into the condition such that $a2=1$ and $a2'=0$. The multi-vibrator 2 will remain in this condition for a predetermined length of time (e.g., about 5 milliseconds). When $a2=1$, the counter 3 starts its counting operation and, in addition, the bistable multi-vibrator 4 is "flipped" into the condition such that $a4=1$ and $a4'=0$. When $a4=1$, the mono-stable multi-vibrator 8 retains its condition such that $a8=0$ and $a8'=1$, because the change from $a4=0$ to $a4=1$ constitutes a negative voltage pulse which is not effective to cause a "flipping" of the multi-vibrator 8.

After the vehicle has traversed a predetermined distance (e.g., 50 feet) past the warning signal, an output signal from the counter 3 is introduced via the path 10 to the AND gate 5 which causes the indicator lamp 5' to light. The AND gate 5 receives the signal from the counter via path 10 and simultaneously receives the $a4=1$ signal from the output $a4$ of the bistable multi-vibrator 4. The indicator lamps 6' and 7' are lighted in a similar manner at, for example, 100 feet and 150 feet, respectively. Advantageously the operator can, in a very simple manner, know the distance which has already been traversed between the warning signal and the main signal. Also, he can know the distance which he still has to travel until the vehicle reaches the main signal, since the distance between the warning signal and the main signal is of a predetermined length. After the vehicle has traversed the entire distance between the warning signal and the main signal, the counter 3 sends a signal pulse via the path 13 to one input of the bistable multi-vibrator 4 to change the multi-vibrator condition such that $a4=0$ and $a4'=1$. Accordingly, all of the indicator lamps 5', 6' and 7' will go out. Also, the mono-stable multi-vibrator 8 "flips," since there is now present a positive voltage pulse at its input. Accordingly, $a8=1$ and the member 9 is actuated. The member 9 may be an alerting device such as a bell or horn. The sound of the bell or horn is purposeful for alerting the operator to initiate measures to decrease the speed of the vehicle and stop it. Alternatively, the member 9 may be a circuit breaker and an electromagnetic brake; the actuation of the member 9 causing the circuit breaker to interrupt power to the prime mover and actuating an electromagnetic brake for the purpose of slowing the vehicle and stopping it. Suitable delay means may be incorporated so that the brake may be applied after the circuit breaker has been opened for a predetermined amount of time.

Figure 5:
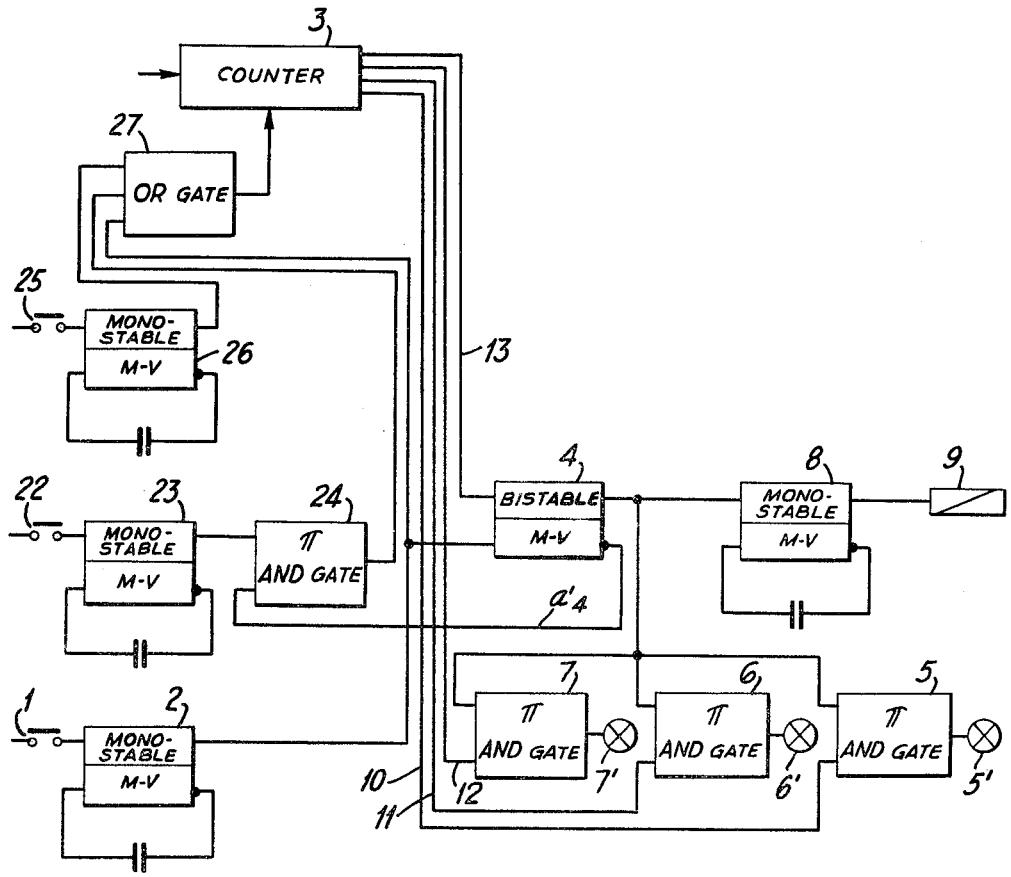
FIG. 5 is a block diagram of the measuring and controlling system according to another embodiment of the invention.

Another embodiment of the invention is illustrated in block diagram form in FIG. 5. Advantageously, the system of FIG. 5 may be used on a vehicle which is controlled by but one operator. As shown, additional circuit elements have been added to the system of FIG. 1 to achieve the system of FIG. 5. In addition to the elements shown in FIG. 1, there is included a second switch 22, another mono-stable multi-vibrator 23, an additional AND gate 24, a "dead man" switch 25, another mono-stable multi-vibrator 26 and an OR gate 27.

The switch 22, together with the mono-stable multi-vibrator 23, the AND gate 24, and the OR gate 27, enable the sole operator of the vehicle to reset the counter 3, thus enabling the counting and distance measuring and ultimate controlling function to start anew. Briefly, the contact 22, when closed, causes the mono-stable multi-vibrator 23 to feed a signal to the AND gate 24. The AND gate 24 also receives an input pulse from the bistable multi-vibrator 4 via the path $a4'$. Accordingly, the AND gate 24 provides an output signal to the input of the OR gate 27. Accordingly, the OR gate 27 provides an output signal to the counter 3 causing a resetting of the counter. However, the action of the switch 22 will be ineffective if the switch 1 has priorly been closed by the operator. In this event $a4'=0$ and, as a consequence, the AND gate 24 is blocked. Accordingly, no disturbance of the counting operation will ensue.

Another feature of the system illustrated at FIG. 5 is represented by the coupling of a "dead man" switch 25, the mono-stable multi-vibrator 26 and the OR gate 27. If for some reason the operator of the vehicle becomes incapacitated and thereby should release his hold on a throttle, push button, or the like, which is continuously operated by him, then the "dead man" switch 25 will close and the mono-stable multi-vibrator 26 will provide an output signal which is fed into the OR gate 27. Accordingly, the OR gate 27 will provide a pulse which is fed into the counter 3, thereby starting the counter 3. Thus, after a predetermined distance, the vehicle will be brought to rest in the manner hereinbefore described with reference to the discussion of the operation of the system of FIG. 1.

The measuring and controlling systems just described may be used to great advantage in connection with the speed controlling system and apparatus described in patent application Serial No. 227,910, filed on October 2, 1962, in the United States Patent Office.

While specific embodiments of the invention have been shown and described in detail to illustrate the application of the inventive principles, it will be understood that the invention may be embodied otherwise without departing from such principles.

What is claimed is:

1. A distance indicating and control initiating system for a vehicle, comprising: a first mono-stable multi-vibrator having an input terminal and an output terminal; switch means connected to the input terminal of the first mono-stable multi-vibrator; counter means having an input terminal and plural output terminals, the output terminals of the first mono-stable multi-vibrator being connected to the input terminal of the counter means; a first bistable multi-vibrator having an output terminal and two input terminals, the output terminal of the first mono-stable multi-vibrator being connected to one input terminal of the bistable multi-vibrator and one output terminal of the counter being connected to the other input terminal of the bistable multi-vibrator; a second mono-stable multi-vibrator having an input terminal and an output terminal, the input terminal being connected to the output terminal of the bistable multi-vibrator; means for initiating control of the vehicle connected to the output terminal of the second mono-stable multi-vibrator; a plurality of AND circuits, each having two input terminals and one output terminal, each AND circuit having one of its input terminals connected to the output terminal of the bistable multi-vibrator, each AND circuit having the other of its input terminals connected to a different one of the plural terminals of said counter means; and, a plurality of display means, each display means being connected to the output terminal of a different AND circuit.

2. A system, according to claim 1, wherein an OR gate having plural input terminals and one output terminal is interposed between the first multi-vibrator and counter means so that the output terminal of the OR gate is connected to the input terminal of the counter means.

3. A system, according to claim 2, including a third mono-stable multi-vibrator having an input terminal and an output terminal, the output terminal being connected to one of the plural input terminals of said OR gate, and second switch means connected to the input terminal of said third mono-stable multi-vibrator.

4. A system, according to claim 1, wherein said bistable multi-vibrator has an additional output terminal and wherein there is further included an additional AND gate having an output terminal and two input terminals, a fourth mono-stable multi-vibrator having an output terminal and an input terminal, and switch means; the additional output terminal of said bistable multi-vibrator being connected to one input terminal of said additional AND gate, the output terminal of said fourth mono-stable multi-vibrator being connected to the other input terminal of said additional AND gate, the output terminal of said additional AND gate being connected to one of the plural input terminals of said OR gate, the switch means being connected to the input terminal of said fourth mono-stable multi-vibrator.

References Cited by the Examiner

UNITED STATES PATENTS

| Re. 21,818 | 6/41  | Halstead      | 340—32     |
| 2,009,693  | 7/34  | Heising       | 340—56     |
| 2,911,636  | 11/59 | Brouse        | 340—282 XR |
| 2,953,694  | 9/60  | Wilson        | 307—88.5   |
| 3,106,259  | 10/63 | Bensema et al.| 340—263 XR |

NEIL C. READ, *Primary Examiner.*